May 11, 1926.

W. C. HUDSON

THREAD CUTTING TEMPLE

Filed Nov. 21, 1925     2 Sheets-Sheet 1

Inventor
Walter C. Hudson
by Heard Smith & Tennant
Attys

May 11, 1926.

W. C. HUDSON

THREAD CUTTING TEMPLE

Filed Nov. 21, 1925

Inventor.
Walter C. Hudson
by Heard Smith & Tennant
Attys

Patented May 11, 1926.

1,584,375

UNITED STATES PATENT OFFICE.

WALTER C. HUDSON, OF ANDERSON, SOUTH CAROLINA, ASSIGNOR TO DRAPER CORPORATION, OF HOPEDALE, MASSACHUSETTS, A CORPORATION OF MAINE.

THREAD-CUTTING TEMPLE.

Application filed November 21, 1925. Serial No. 70,466.

This invention relates to a thread cutting temple such as is employed particularly in connection with the automatic filling replenishing loom and which acts to sever close to the selvage any filling ends left extending therefrom.

The object of the invention is to provide such a device in which two cooperating shear cutter blades are employed so shaped as to catch and hold the filling before it is severed by the cutters.

The object of the invention is further to provide such a device in which two cooperating shear blades are employed both actuated by the relative movement which takes place between the temple and the temple stand at each beat-up of the lay.

The object of the invention is further to provide such a device in which two cooperating shear cutters are employed mounted on a common fixed pivot in the temple head and both moved to effect the cutting action.

The object of the invention is further to provide a simple and efficient form of thread cutting temple employing a pair of cooperating pivotally mounted shear cutters.

These and other objects and features of the invention will appear more fully from the accompanying description and drawings and will be particularly pointed out in the claims.

Figure 1:
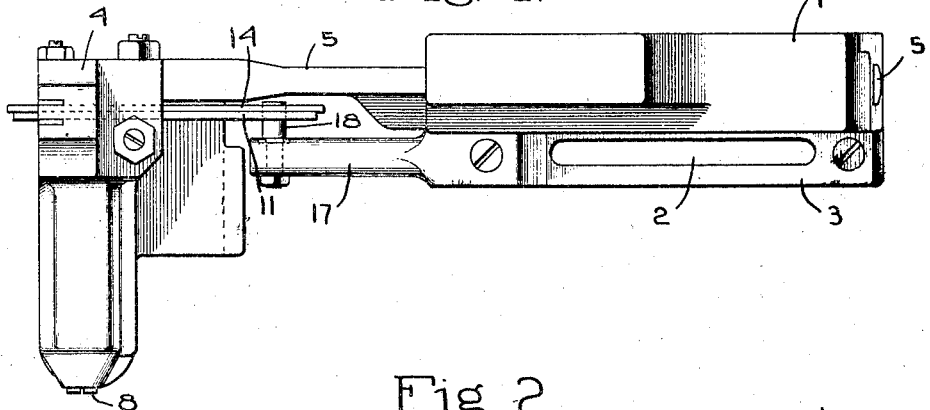
Fig. 1 is a top plan view of a temple and temple stand embodying a simple and preferred form of the invention.

As the general construction and operation of the thread cutting temple is well known and familiar to those skilled in the weaving art, it is only necessary here to illustrate and describe such a device sufficiently to disclose the present invention.

The temple stand 1 is usually a hollow box-like structure secured in place to the breast beam of the loom by bolts passing through a slot 2 in the flange 3 thereof. The temple comprises a head portion 4 with a shank 5 extending forwardly therefrom. This shank is mounted to slide longitudinally in the temple stand and is normally held projected rearwardly by the spring 6 within the stand and surrounding the shank. The temple contains the usual pin roll 7 journalled on a stud or studs 8 mounted in the temple head. The temple head is also provided with a depending heel 9. At each beat-up of the lay, this heel 9 is struck and the temple head with its shank carried forwardly. As the lay retracts, the spring 6 slides the shank and head back to their rearward position.

The cutting instrumentalities are usually mounted in a slot extending vertically in the temple head adjacent the end of the pin roll. Such a slot is employed in the present case.

The cutting instrumentalities in this invention comprises a pair of shear cutting blades mounted to swing vertically in the aforesaid slot upon a common pivot pin 10 located forwardly of the stud 8 and extending transversely of the slot. The blade 11 nearer the pin roll is curved upwardly, rearwardly and downwardly from its fulcrum point so as to extend over the stud 8 in all positions. At its extreme rearward end it is hook-shaped or presents a generally concave face, one portion of which is provided with a bevelled cutting edge 12. The portion of the blade 11 forward of the pivot is provided with an angle-shaped slot 13. The other blade 14 is curved upwardly, rearwardly and downwardly so as to extend over the stud 8 and also presents at its rear end a hook shape and has a generally concave face which is also bevelled at 15 to present a cutting edge. The forward portion of this blade is also provided with an angle-shaped slot 16. The rearward cutting ends of both blades project rearwardly from the slot in the temple head. The temple stand is provided with a rearwardly projecting arm 17 carrying a transverse stud 18 which extends into and cooperates with the angle-shaped slots 13 and 16. These slots are so shaped as to give the proper closing and opening movements of the shear cutter blades each time the temple head is moved forwardly by the lay and backwardly by the spring 6.

Figure 2:
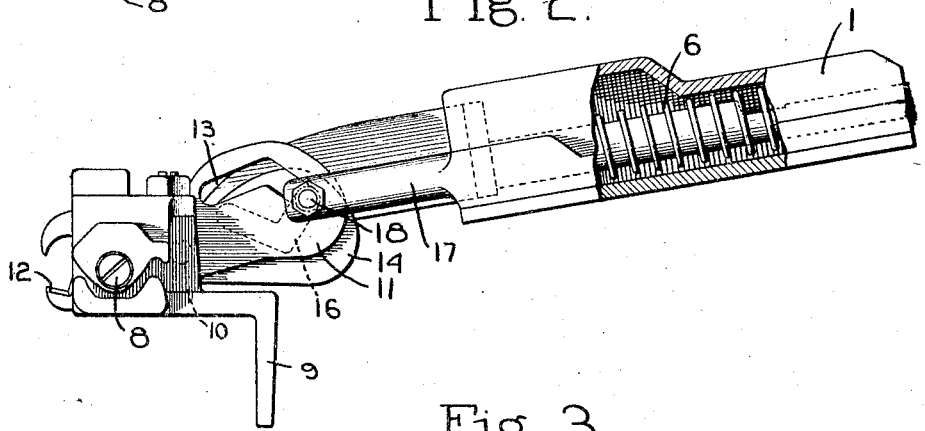
Fig. 2 is a side elevation partially broken away of the construction shown in Fig. 1.
Figure 3:
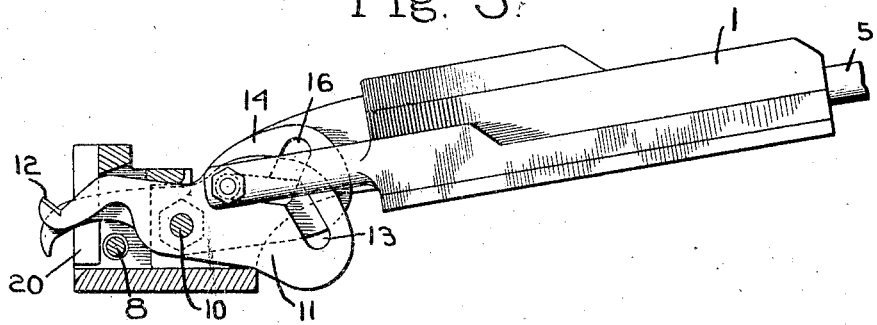
Fig. 3 is a view in side elevation and partially in vertical cross section with the parts in the position they assume when the temple has been carried to its extreme forward position by the lay.
Figure 4:
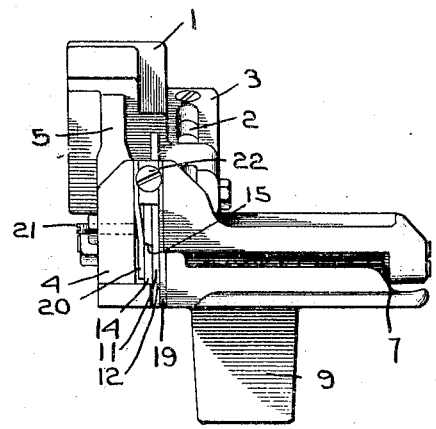
Fig. 4 is a front elevation of the construction shown in Fig. 1.
Figure 5:
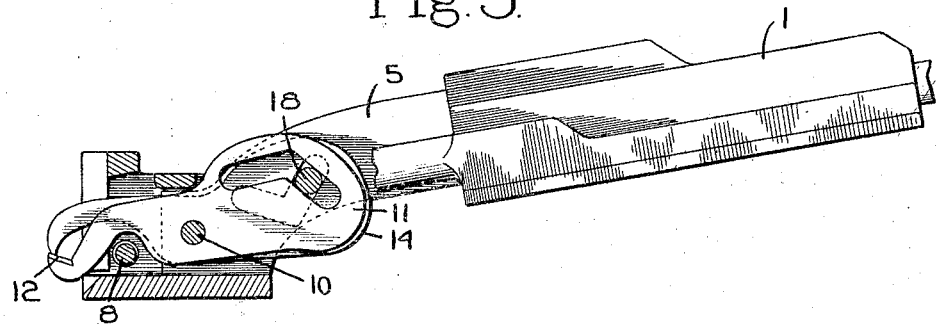
Fig. 5 is a view similar to Fig. 3 with the blades just closing to catch and hold the filling.

In the operation of the device the blades stand normally open, as shown in Fig. 2, leaving a wide space between to permit the filling to enter. As the weaving operation proceeds, any filling ends extending from the selvage are carried between the open ends of the shear cutter blades. Each time the lay beats up, the two blades are both swung about their common pivot to closed position. As this movement progresses, the blades come to a position such as shown in Fig. 5, where they encircle or catch and hold the filling ends and then, as the operation proceeds, the cutting ends of the blades pass each other after the manner of a pair of shears and effect a sure, accurate and clean cut of the filling. When the lay retracts, the temple head is projected rearwardly by the spring 6 and the blades move to open position.

It is important that the two blades shall have a rubbing contact in order to maintain their edges sharp and insure a clean cut. For this purpose a plate 19 is mounted vertically in the slot in which the shear cutters are located and adjacent the wall nearer the pin roll. A second plate 20 is mounted at its upper end in the slot at the opposite side of the cutter blades. This plate is backed up by an adjustable set screw 21 mounted in the temple head. Hence, by adjusting the set screw 21, the plate 20 is forced against the cutter blades, thus pressing the cutting ends together and insuring the desired action. The plates 19 and 20 are conveniently located in slots in the temple head and held in place by a set screw 22.

There is thus provided a very simple and efficient construction in which both shear cutting blades are positively actuated in both directions, thus eliminating the use of any springs for directly actuating the cutter members. Both blades are located upon a fixed pivot and thus are definitely and positively positioned in the temple head. Since both blades are moved and since preferably both are hook-shaped at their cutting ends, the filling is caught and held before severing. The two blades, particularly when pressed together by a construction such as shown, uniformly and regularly produce a clean, shearing cut of the filling.

Having thus described the invention, what is claimed as new, and desired to be secured by Letters Patent, is:

1. In a loom, a temple stand, a temple head having a shank mounted to slide in the stand, a spring acting normally to slide the shank rearwardly in the stand, a pair of vertically movable cooperating shear cutters mounted in and projecting rearwardly of the head, and means for effecting the closing and opening movements of the shear cutters from the relative sliding movements of the stand and shank.

2. In a loom, a temple stand, a spring pressed shank slidably mounted therein, a head on the shank, a pair of vertically swinging shear cutters pivoted on a common pivot in said head and projecting rearwardly of said head, a pin on the stand, and each of said shear cutters having an angle-shaped slot in its portion forward of the pivot engaging said pin and acting to effect the closing and opening movements of the shear cutters when the temple head and shank are pushed forwardly by the lay and rearwardly by the spring.

3. In a loom, a temple, a pair of cooperating shear cutters mounted on a common fixed pivot in the temple head and projecting rearwardly of the head, and means to swing both of the said shear cutters on their pivot to effect the closing movement thereof upon the beat-up and then to swing both of the said shear cutters on the said pivot to open position.

4. In a loom, the construction defined in claim 3, in which the shear cutters both have opposed hook-shaped ends having cutting edges which catch and hold the filling before closing sufficiently to perform the actual cutting operation.

5. In a loom the construction defined in claim 3, in which the cutting ends of the said shear cutters are hook-shaped with the cutting edges formed on the concave portions and facing each other.

6. In a loom, a temple having a transverse stud and a pin roll mounted on the stud and a slot extending vertically of and transversely of said stud, a pivot pin extending transversely of said slot parallel with and forwardly of the stud, a pair of shear cutters pivoted on the said pivot pin and curved to extend rearwardly above and thence below said stud and projecting rearwardly from the said slot.

In testimony whereof, I have signed my name to this specification.

WALTER C. HUDSON.